US011367035B2

(12) United States Patent
Dahod et al.

(10) Patent No.: US 11,367,035 B2
(45) Date of Patent: Jun. 21, 2022

(54) BLOCKCHAIN ASSISTED ASSET PEDIGREE TRACEBACK

(71) Applicant: TRACELINK, INC., North Reading, MA (US)

(72) Inventors: Shabbir M. Dahod, Andover, MA (US); Robert Sturim, Wenham, MA (US); Vivek Madhu Sudan Badri Narayan, Boston, MA (US); Lucia Deus, Reading, MA (US)

(73) Assignee: Tracelink, Inc., North Reading, MA (US)

( * ) Notice: Subject to any disclaimer, the term of this patent is extended or adjusted under 35 U.S.C. 154(b) by 592 days.

(21) Appl. No.: 16/296,674

(22) Filed: Mar. 8, 2019

(65) Prior Publication Data

US 2020/0286026 A1 Sep. 10, 2020

(51) Int. Cl.

*G06Q 10/00* (2012.01)
*G06Q 10/08* (2012.01)
*H04L 9/06* (2006.01)
*G06F 16/182* (2019.01)

(52) U.S. Cl.

CPC ......... *G06Q 10/08* (2013.01); *G06F 16/1824* (2019.01); *H04L 9/0643* (2013.01); *H04L 2209/38* (2013.01)

(58) Field of Classification Search

CPC ... G06Q 10/08; G06F 16/1824; H04L 9/0643; H04L 2209/38
USPC .......................................................... 705/333
See application file for complete search history.

(56) References Cited

U.S. PATENT DOCUMENTS

| | | | | |
|---|---|---|---|---|
| 10,581,847 | B1 * | 3/2020 | Sun | H04W 12/40 |
| 11,170,092 | B1 * | 11/2021 | Liang | G06F 21/645 |
| 2011/0320805 | A1 | 12/2011 | Chaves et al. | |
| 2012/0234908 | A1 | 9/2012 | Wang et al. | |
| 2016/0283920 | A1 * | 9/2016 | Fisher | H04L 9/3297 |
| 2018/0167198 | A1 * | 6/2018 | Muller | G06F 21/44 |
| 2020/0057980 | A1 * | 2/2020 | Perkowitz | H04L 9/0637 |
| 2020/0159891 | A1 * | 5/2020 | Patel | H04L 9/3239 |

FOREIGN PATENT DOCUMENTS

| | | |
|---|---|---|
| EP | 3413249 | 12/2018 |
| FR | 3016457 | 7/2015 |

* cited by examiner

*Primary Examiner* — Daniel A Hess
(74) *Attorney, Agent, or Firm* — CRGO Global; Steven M. Greenberg

(57) ABSTRACT

A trace history generation method includes receiving from an originating participant in a custody chain of transactions of an asset, by an intermediate participant, a trace history request for the asset. The request has an identification of an owner, data identifying the asset and a parent transaction identification in association with another of the participants, and a hash of the data. Thereafter, an identifier is assigned for the request and the request verified by interrogating a blockchain with the hash. Upon verification, a trace history document is generated including the data identifying the asset, an identifier of the intermediate participant, and a disposition of the asset including an identifier of a next nearest participant. A hash is computed for the trace history and a blockchain transaction performed recording and storing the hash in connection with the assigned identifier. Finally, the document is transmitted to the originating participant.

18 Claims, 2 Drawing Sheets

BLOCKCHAIN ASSISTED ASSET PEDIGREE TRACEBACK

BACKGROUND OF THE INVENTION

Field of the Invention

The present invention relates to the field of asset tracing, and more particularly to business-to-business accounting of an asset pedigree.

Description of the Related Art

An asset pedigree refers to a lifetime accounting of the creation, movement and consumption of an asset from manufacturing source to consumer. Classically, asset pedigree tracking is of great importance in the context of regulated industry such as in drug distribution. More specifically, traceback (and trace forward) are essential components of pedigree tracking. In traceback, any participant in the chain of distribution of an asset may inquire as to the pedigree of a specified asset—usually by serial number—to an original source of the asset beyond the most immediate supplier to the participant. Conversely, in trace forward, any participant in the chain of distribution of an asset may inquire as to the ultimate disposition of an asset to consumption—also usually by serial number.

Notably, in many countries, in furtherance of the traceability of a pharmaceutical asset, the relevant regulatory environment requires drug manufacturers to affix a scannable product identifier to all drugs that are packaged for pharmaceutical use. The purpose of this requirement is to enable the confirmation of the validity, legitimacy, and source of all applicable products within the pharmaceutical supply chain in real time. Consequently, each participant in the supply chain of a subject pharmaceutical must be able to provide information of any given product within short period of time—sometimes in mere days, as well as notify the relevant governmental regulatory body and all partners in the supply chain of the pharmaceutical of any problems for example contamination and manufacturers defect. Thus, for each transaction in which a participant in the supply chain of a subject asset transfers ownership of the subject asset, the participant must pass along that transaction history, transaction information—including lot-level information—and a transaction statement of the product, all within a single document. It is this document—the trace history—that must be stored.

As will be apparent, the process of determining the trace history of a subject asset requires the cooperation of each participant in the supply chain. As well, the contemporary process of trace request processing—whether trace forward from a point in the supply chain to ultimate consumption, or trace back from a point in the supply chain to the point of manufacture—requires a certain degree of transparency such that each participant in the supply chain subject to the request gains visibility into the identity of each other participant. This visibility is required to verify the authenticity of the generated trace document. Yet, revealing the identity of each participant in the supply chain may not be desirable as the identity of one or more of the participants may be proprietary to the immediate upstream and downstream participants in the supply chain. Further, the involvement of so many participants in the supply chain offers unwanted opportunities for the mutation of the trace report so as to produce inaccurate data within the trace report.

BRIEF SUMMARY OF THE INVENTION

Embodiments of the present invention address deficiencies of the art in respect to asset pedigree determination and provide a novel and non-obvious method, system and computer program product for blockchain assisted asset pedigree traceback and trace forward. In an embodiment of the invention, a trace history generation method includes the receipt from an originating participant amongst several participants in a custody chain of transactions of an identifiable asset, by an intermediate one of the several participants in the custody chain, from over a computer communications network, of a trace history request for the identifiable asset. The request may be accompanied by an identification of an owner of the trace history request, data identifying the asset and a parent transaction identification in association with another of the participants in the custody chain, and a hash encrypted form of the data. Thereafter, an identifier is assigned for the trace history request and the trace history request may be verified by interrogating a blockchain at a block corresponding to the identification of the owner of the trace history request, with the hash encrypted form of the data.

On the condition that the trace history is not verified, a rejection may be transmitted to the originating participant over the computer communications network. But otherwise, on the condition that the trace history is verified, a trace history document is generated. When generated, the trace history document includes the data identifying the asset, an identifier of the intermediate one of the several participants, and a disposition of the identified asset including an identifier of a next nearest one of the several participants in the custody chain. Then, a hash is computed for the generated trace history and a blockchain transaction performed that records and stores the computed hash in connection with the assigned identifier of the trace history request. Finally, the generated trace history document is transmitted in a response to the request to the originating participant over the computer communications network.

In one aspect of the embodiment, the intermediate one of the several participants is an upstream seller of the identified asset and the next nearest one of the several participants in the custody is a purchaser of the identified asset from the intermediate one of the several participants. Conversely, in another aspect of the embodiment, the intermediate one of the several participants is an upstream purchaser of the identified asset and the next nearest one of the several participants in the custody is a seller of the identified asset to the intermediate one of the several participants. In either circumstance, the disposition of the asset may include a disposition such as accept and forward to a next nearest participant in the custody chain, or accept and terminate as an origin or final destination of the asset, or split as between two or more different nearest participants in the custody chain, or a denial of handling the asset. Finally, in even yet another aspect of the embodiment, the verification of the trace history includes locating the block in the blockchain corresponding to the request by interrogating a blockchain with the identification of the owner of the trace history request and locating in the block data identifying the originating participant.

In another embodiment of the invention, a data processing system is configured for trace history generation. The system includes a host computing platform that includes one or more computers, each with memory and at least one processor, and a trace history generation module for an intermediate one of several participants in a custody chain of transactions of an identifiable asset. The module includes computer program instructions executing in the memory of the host computing platform. The instructions when executing in the memory, receive from an originating participant in the custody chain, from over a computer communications network, a trace history request for the identifiable asset accompanied by an identification of an owner of the trace history request, data identifying the asset and a parent transaction identification in association with another of the participants in the custody chain, and a hash encrypted form of the data.

The instructions further assign an identifier for the trace history request and verify the trace history request by interrogating a blockchain at a block corresponding to the identification of the owner of the trace history request, with the hash encrypted form of the data. Finally, the instructions, on condition that the trace history is not verified, transmit a rejection to the originating participant over the computer communications network. But otherwise, the instructions, on condition that the trace history is verified, generate a trace history document including the data identifying the asset, an identifier of the intermediate one of the several participants, and a disposition of the identified asset including an identifier of a next nearest one of the several participants in the custody chain, compute a hash for the generated trace history, perform a blockchain transaction that records and stores the computed hash in connection with the assigned identifier of the trace history request and transmits in a response the generated trace history document to the originating participant over the computer communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
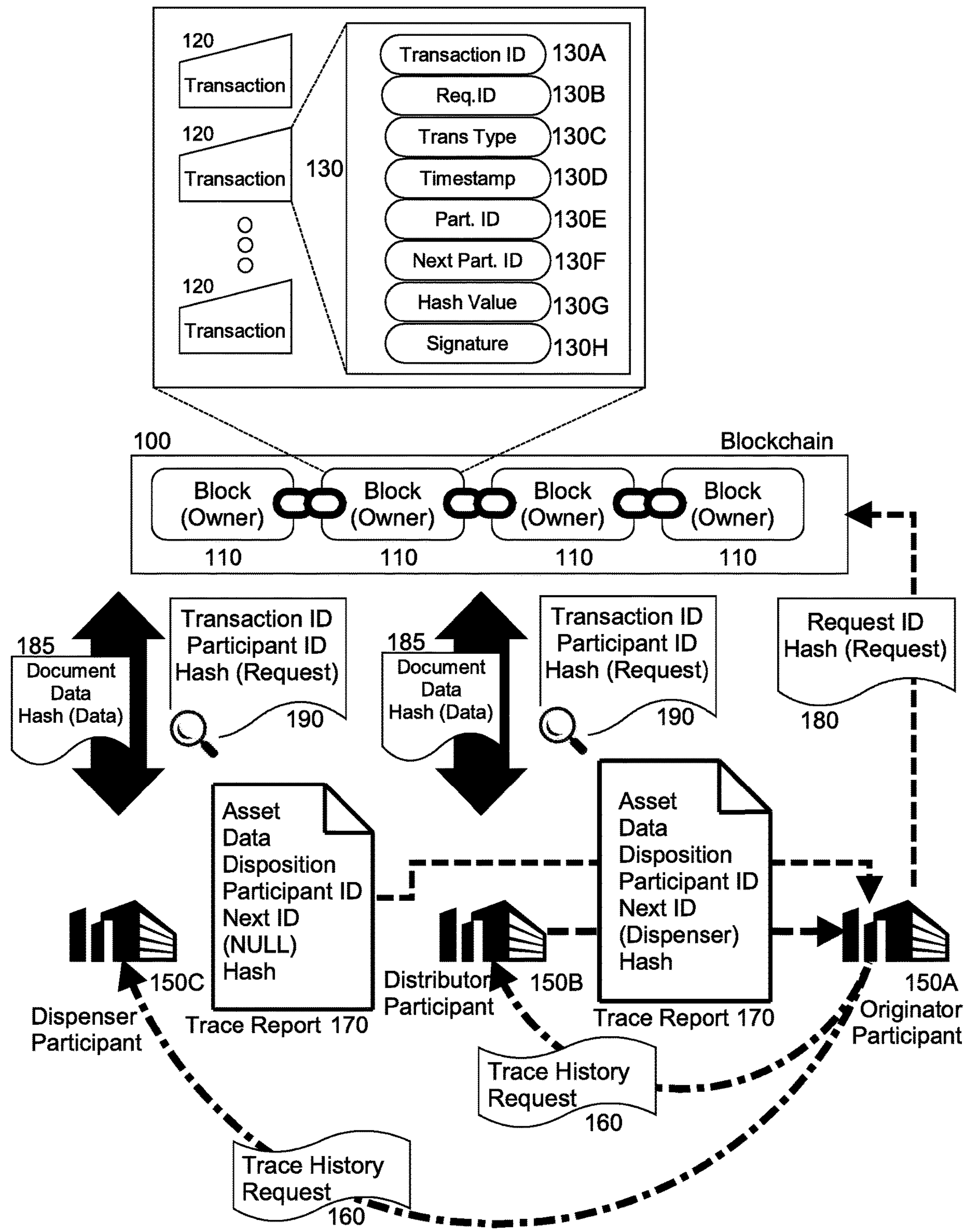
FIG. 1 is pictorial illustration of a process for trace history generation.

Embodiments of the invention provide for trace history generation. In accordance with an embodiment of the invention, an originator of a trace history request within a custody chain of different participants engaging in custodial transactions of an identifiable asset from manufacture to consumption, transmits a trace request to next nearest participant in the custody chain, for instance a next nearest downstream participant to whom the originator sold the identifiable asset, or a next nearest upstream participant from whom the originator purchased the identifiable asset. As well, the originator performs a blockchain transaction in respect to a blockchain accessible over a computer communications network, the transaction recording and storing a computed hash for the trace history request in connection with an assigned identifier of the trace history request. The trace history request itself includes the assigned identifier of the trace history request, an identifier of a parent transaction, an identification of the identifiable assets and an identification of the originator.

In response to the trace history request, the recipient participant verifies the trace history request by interrogating the blockchain at a block corresponding to the assigned identifier, with the hash encrypted form of the data. To the extent the recipient participant is unable to verify the trace history request by computing a hash for the content of the trace history request and comparing the computed hash to the hash within the block, the recipient transmits a rejection message to the originator over the computer communications network. But, otherwise, the recipient participant having verified the trace history request, the recipient participant generates a trace history document. The trace history document includes data that identifies the asset, an identifier of the recipient participant, and a disposition of the identified asset including an identifier of a next nearest one of the participants in the custody chain in a direction in the custody chain opposite the originator. The recipient participant then computes a hash for the generated trace history and includes the hash with the trace history and performs a blockchain transaction on the block that records and stores in the block the computed hash in connection with the assigned identifier of the trace history request. Finally, the recipient participant transmits over the computer communications network to the originator in a response to the trace history request, the generated trace history document.

The originator upon receiving the trace history document verifies the content of the trace history document with the associated hash and extracts from the trace history document the disposition information for inclusion in a trace history of the asset. As well, the originator extracts from the trace history document, the identification of the next nearest one of the participants in the custody chain. As such, to the extent the disposition does not indicate a termination of the custody chain so that the next nearest one of the participants in the custody chain is an intermediate one of the several participants in the custody chain, the originator formulates a new trace history request to the next nearest one of the participants in the custody chain. Thereafter, the process repeats until the originator has transmitted to each one of the participants in the custody chain, a corresponding trace history request and received in return, a trace history document so that the trace history report includes the identity of each of the participants in the custody chain from the originator to a terminating end point, and a disposition of the identified asset at each of the participants. In this way, a trace history can be determined for the identifiable asset without requiring the non-confidential disclosure of the identity of each of the participants in the custody chain to each of the participants and at the same time, ensuring the authenticity by each of the participants of received trace history requests and also the authenticity of each generated trace history document.

In further illustration, FIG. 1 pictorially illustrates a process for trace history generation. As shown in FIG. 1, an originator participant 150A in a custody chain of participants 150A, 150B, 150C issues a trace history request 160 to a next participant 150B in the custody chain in respect to an identifiable asset and records onto a blockchain 100 a transaction 180 that includes identifier for the request 160 and a hash value of the request 160 and receives in return from the blockchain 100, an automatically generated transaction identifier. The next participant 150B verifies the trace history request 160 by issuing a query 190 to a block 110 on the blockchain 100 with the transaction identifier for the trace history request 160 and originator identification of the originator participant 150A. To the extent that the blockchain 100 includes a block 110 that includes a request identifier 120 corresponding to that of the query 180 and that the originator identification of the query 180 can be located within the block 110 as the originator of the trace history request, and that a hash value stored in the block 110 for the request identifier 120 matches a hash computed for the trace history request 160, the trace history request 160 is verified.

Once the next participant 150B verifies the trace history request 160, the next participant 150B generates a trace history document 170 including asset data pertaining to the asset, such as an asset name, serial number and order number, and an indication of a disposition of the asset, such as accept and forward to a next nearest participant in the custody chain, or accept and terminate as an origin or final destination of the asset, or split as between two or more different nearest participants in the custody chain, or a denial of handling the asset. The trace history document 170 additionally is generated to include a self-identifier for the next participant 150B and an identifier of the next nearest participant 150C in the custody chain. Finally, the trace history document 170 is generated to include a hash value for the data in the trace history document 170. Then, a blockchain write operation 185 is issued to the blockchain 100 with a transaction identifier 130A, a request identifier 130B of the request 160, a transaction type 130C corresponding to the indication of the disposition of the asset, a timestamp 130D, the self-identifier 130E for the next participant 150B, an identifier for a next nearest participant 130F to the next participant 150B, and the hash value 130G for the data 140 in the trace history document 170 along with a digital signature of the next participant 150B.

Then, the trace history document 170 is returned to the originator participant 150A. The originator participant 150 then verifies the authenticity of the trace history document 170 in reference to the hash value 130G stored in the blockchain 100 for the transaction identifier 130A provided by the next participant 150B. Consequently, the originator participant 150A then identifies the next nearest participant 150C from the trace history document 170 and issues a next trace history request 160 to the next nearest participant 150C. The process then repeats such that the originator participant 150A is able to aggregate the data from the various trace history documents 170 produced by each of the participants 150B, 150C in the custody chain so as to produce a complete trace history for the identified asset while permitting full verification of each trace history request 160 and the returned trace history documents in reference to the block 110 on the blockchain 110 without revealing to each of the participants 150B, 150C the identity of one another.

Figure 2:
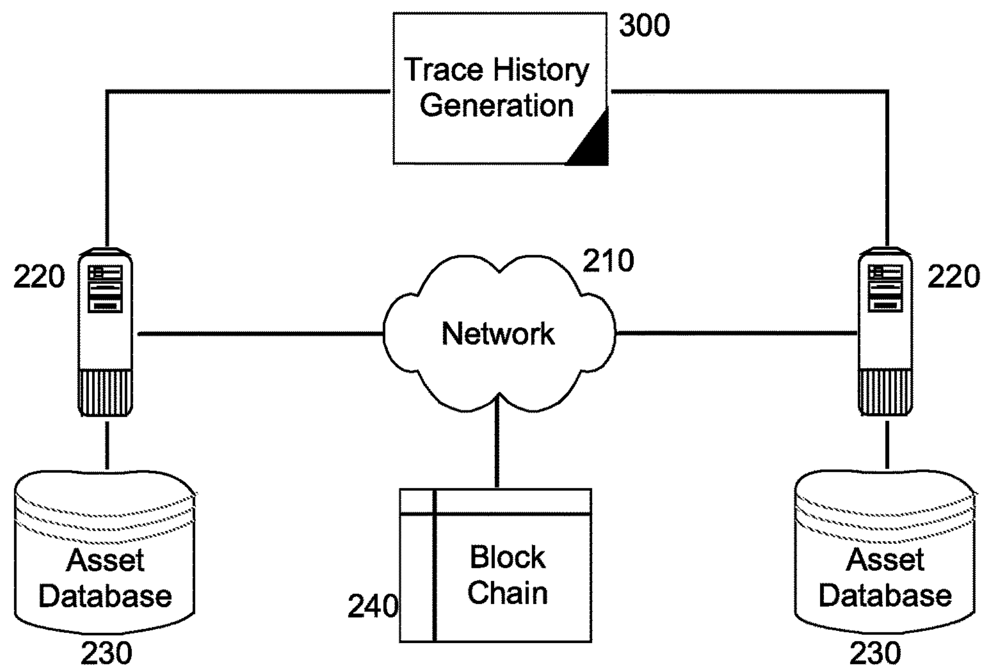
FIG. 2 is a schematic illustration of a data processing system configured for trace history generation; and, FIG. 3 is a flow chart illustrating a process for trace history generation.

The process described in connection with FIG. 1 may be implemented within a computer data processing system. In further illustration, FIG. 2 schematically shows a data processing system configured for trace history generation. The system includes different host computing platforms 220, each including one or more computers each with at least one processor and memory. The host computing platforms 220 each correspond to a different participant in a custody chain for an identifiable asset and each of the host computing platforms 220 are coupled to one another communicatively over computer communications network 210. Each of the host computing platforms 220 includes an asset database 230 storing therein, asset data for different ones of the assets including an identification of each of the assets, and a corresponding serial number and indication of disposition including to which one of the participants in the custody chain the asset had been disposed and from which of the participants in the custody chain the asset had been received.

Of note, each of the host computing platforms 220 accesses a blockchain 240 from over the computer communications network 210. As well, each of the host computing platforms 220 accesses a trace history generation module 300. In this regard, the trace history generation module 300 includes computer program instructions, a copy of which are stored in memory of each of the host computing platforms 220, or a copy of which is stored remotely from each of the host computing platforms 220 and is retrieved for execution on demand by each of the host computing platforms 220 or invoked for execution by each of the host computing platforms 220 as a cloud-based service. In any event, upon execution, the program instructions of the module 300 are enabled to receive a trace history request from an originator participant in a custody chain for an identifiable asset. The program code additionally is enabled to verify the request in reference to a block in the blockchain with a transaction identifier matching that of the received request and to deny the request if the request does not verify.

On the condition that the request can be verified by the program instructions of the module 300 in respect to the blockchain 240, the program instructions are enabled to generate a trace history document including pertinent information regarding the identifiable asset of the request along with an indication of a disposition of the identifiable asset and an identity of a next nearest one of the participants from which the identifiable asset had been received in the event of a trace back request, or to which the identifiable asset had been delivered in the event of a trace forward request. Finally, the program instructions of the module 300 are enabled to compute a hash value for the content of the trace history report, to sign the hash value with a digital certificate of the recipient participant, and to insert the hash value and the digitally signed hash value into the trace history report. As well, the program instructions are enabled to write onto the block of the block chain both an identifier of the corresponding one of the participants and the hash value while returning the generated trace history report to the originating one of the participants from whom the trace request had been received.

Figure 3:
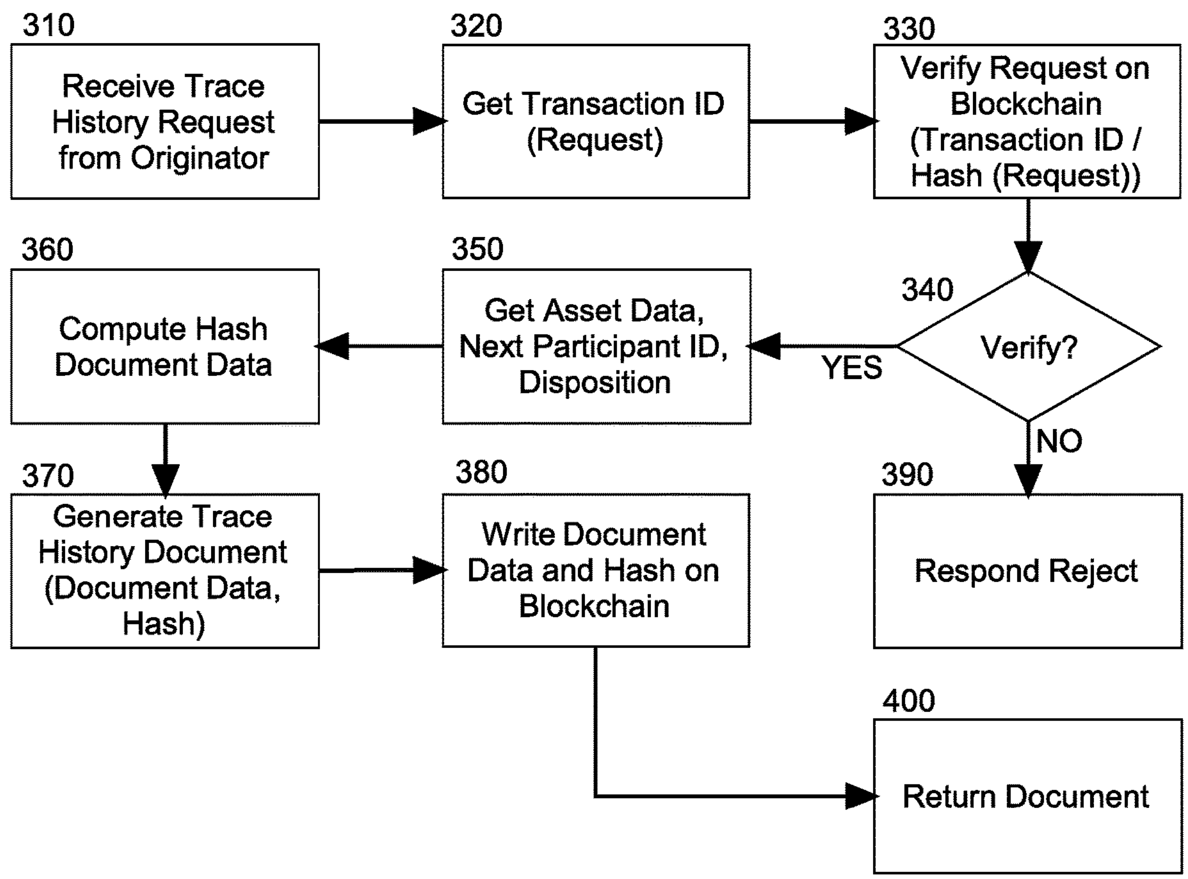

In even further illustration of the operation of the trace history generation module 300, FIG. 3 is a flow chart illustrating a process for trace history generation. Beginning in block 310, a trace history request for an identifiable asset is received by a recipient participant from an originating participant. In block 320, a transaction identifier for the trace history request is retrieved from the trace history request and in block 330, the trace history request is verified on a block of a blockchain, the block corresponding to the transaction identifier. As well, the trace history request is verified by comparing a hash value computed for the trace history request with a hash value stored on the block of the block chain. Finally, within the block, an identifier for the originating participant is located in order to verify the trace history request. In decision block 340, if the identifier of the originating participant cannot be located within the block, or if a block cannot be located in the blockchain that corresponds to the transaction identifier, in block 390 a rejection message is sent by the recipient participant to the originating participant in the custody chain. And, if the block is located in the blockchain that corresponds to the transaction identifier but the hash value stored therein does not match a hash value computed for the trace history request, as well, in block 390 a rejection message is sent by the recipient to the originating participant in the custody chain. Otherwise, the process continues through block 350.

In block 350, the trace history request having been verified, data for the identifiable asset is retrieved such as asset name, serial number and description. As well, a disposition of the identifiable asset is retrieved within data storage of the recipient participant along with an identification of a next nearest participant. The retrieved data is then inserted a trace history document and a hash value is both computed for the retrieved data in block 360 and inserted into the trace history document in block 370. In block 380, both an identification for the recipient participant and the computed hash value are stored on the block of the blockchain. Finally, in block 400 the generated trace history document is transmitted to the originating participant.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A trace history generation method comprising:

receiving a trace history request from an originating participant amongst several participants in a custody chain of transactions of an identifiable asset, the originating participant originating the trace history request, by an intermediate one of the several participants in the custody chain, from over a computer communications network, the trace history request comprising a request for the identifiable asset accompanied by an identification of the originating participant, data identifying the asset and a parent transaction identification in association with another of the participants in the custody chain, and a hash encrypted form of the data;

assigning an identifier for the trace history request and verifying the trace history request by interrogating a blockchain at a block corresponding to the identification of the originating participant, with the hash encrypted form of the data; and on condition that the trace history is not verified, transmitting a rejection to the originating participant over the computer communications network, but otherwise on condition that the trace history is verified, generating a trace history document including the data identifying the asset, an identifier of the intermediate one of the several participants, and a disposition of the identified asset including an identifier of a next nearest one of the several participants in the custody chain, computing a hash for the generated trace history, performing a blockchain transaction that records and stores the computed hash in connection with the assigned identifier of the trace history request and transmitting in a response the generated trace history document to the originating participant over the computer communications network.

2. The method of claim 1, wherein the intermediate one of the several participants is an upstream seller of the identified asset and wherein the next nearest one of the several participants in the custody is a purchaser of the identified asset from the intermediate one of the several participants.

3. The method of claim 1, wherein the intermediate one of the several participants is an upstream purchaser of the identified asset and wherein the next nearest one of the several participants in the custody is a seller of the identified asset to the intermediate one of the several participants.

4. The method of claim 1, wherein the disposition of the asset comprises a disposition selected from the group consisting of accept and forward to a next nearest participant in the custody chain, accept and terminate as an origin or final destination of the asset and split as between two or more different nearest participants in the custody chain.

5. The method of claim 1, wherein the disposition of the asset includes a denial of handling the asset.

6. The method of claim 1, wherein the verification of the trace history comprises locating the block in the blockchain corresponding to the request by interrogating a blockchain with the identification of the owner of the trace history request and locating in the block data identifying the originating participant.

7. A data processing system configured for trace history generation, the system comprising:

a host computing platform comprising one or more computers, each with memory and at least one processor; and, a trace history generation module comprising computer program instructions executing in the memory of the host computing platform, the instructions performing:

receiving a trace history request from an originating participant amongst several participants in a custody chain of transactions of an identifiable asset, the originating participant originating the trace history request, by an intermediate one of the several participants in the custody chain, from over a computer communications network, the trace history request comprising a request for the identifiable asset accompanied by an identification of the originating participant, data identifying the asset and a parent transaction identification in association with another of the participants in the custody chain, and a hash encrypted form of the data;

assigning an identifier for the trace history request and verifying the trace history request by interrogating a blockchain at a block corresponding to the identification of the originating participant, with the hash encrypted form of the data; and on condition that the trace history is not verified, transmitting a rejection to the originating participant over the computer communications network, but otherwise on condition that the trace history is verified, generating a trace history document including the data identifying the asset, an identifier of the intermediate one of the several participants, and a disposition of the identified asset including an identifier of a next nearest one of the several participants in the custody chain, computing a hash for the generated trace history, performing a blockchain transaction that records and stores the computed hash in connection with the assigned identifier of the trace history request and transmitting in a response the generated trace history document to the originating participant over the computer communications network.

8. The system of claim 7, wherein the intermediate one of the several participants is an upstream seller of the identified asset and wherein the next nearest one of the several participants in the custody is a purchaser of the identified asset from the intermediate one of the several participants.

9. The system of claim 7, wherein the intermediate one of the several participants is an upstream purchaser of the identified asset and wherein the next nearest one of the several participants in the custody is a seller of the identified asset to the intermediate one of the several participants.

10. The system of claim 7, wherein the disposition of the asset comprises a disposition selected from the group consisting of accept and forward to a next nearest participant in the custody chain, accept and terminate as an origin or final destination of the asset and split as between two or more different nearest participants in the custody chain or split as between two or more different nearest participants in the custody chain.

11. The system of claim 7, wherein the disposition of the asset includes a denial of handling the asset.

12. The system of claim 7, wherein the verification of the trace history comprises locating the block in the blockchain corresponding to the request by interrogating a blockchain with the identification of the owner of the trace history request and locating in the block data identifying the originating participant.

13. A computer program product for trace history generation, the computer program product including a computer readable storage medium having program instructions embodied therewith, the program instructions executable by a device to cause the device to perform a method including:

receiving a trace history request from an originating participant amongst several participants in a custody chain of transactions of an identifiable asset, the originating participant originating the trace history request, by an intermediate one of the several participants in the custody chain, from over a computer communications network, the trace history request comprising a request for the identifiable asset accompanied by an identification of the originating participant, data identifying the asset and a parent transaction identification in association with another of the participants in the custody chain, and a hash encrypted form of the data;

assigning an identifier for the trace history request and verifying the trace history request by interrogating a blockchain at a block corresponding to the identification of the originating participant, with the hash encrypted form of the data; and on condition that the trace history is not verified, transmitting a rejection to the originating participant over the computer communications network, but otherwise on condition that the trace history is verified, generating a trace history document including the data identifying the asset, an identifier of the intermediate one of the several participants, and a disposition of the identified asset including an identifier of a next nearest one of the several participants in the custody chain, computing a hash for the generated trace history, performing a blockchain transaction that records and stores the computed hash in connection with the assigned identifier of the trace history request and transmitting in a response the generated trace history document to the originating participant over the computer communications network.

14. The computer program product of claim 13, wherein the intermediate one of the several participants is an upstream seller of the identified asset and wherein the next nearest one of the several participants in the custody is a purchaser of the identified asset from the intermediate one of the several participants.

15. The computer program product of claim 13, wherein the intermediate one of the several participants is an upstream purchaser of the identified asset and wherein the next nearest one of the several participants in the custody is a seller of the identified asset to the intermediate one of the several participants.

16. The computer program product of claim 13, wherein the disposition of the asset comprises a disposition selected from the group consisting of accept and forward to a next nearest participant in the custody chain, accept and terminate as an origin or final destination of the asset and split as between two or more different nearest participants in the custody chain.

17. The computer program product of claim 13, wherein the disposition of the asset includes a denial of handling the asset.

18. The computer program product of claim 13, wherein the verification of the trace history comprises locating the block in the blockchain corresponding to the request by interrogating a blockchain with the identification of the owner of the trace history request and locating in the block data identifying the originating participant.

* * * * *